United States Patent [19]

Sigmon

[11] Patent Number: 4,782,741
[45] Date of Patent: Nov. 8, 1988

[54] VANELESS ROTARY AIRLOCK VALVE

[76] Inventor: James W. Sigmon, 2415 Knollwood Rd., Charlotte, N.C. 28211

[21] Appl. No.: 22,050

[22] Filed: Mar. 5, 1987

Related U.S. Application Data

[63] Continuation-in-part of Ser. No. 882,351, Jul. 7, 1986, abandoned, and a continuation-in-part of Ser. No. 570,586, Jan. 13, 1984, abandoned.

[51] Int. Cl.$^4$ .............................................. B65G 47/82
[52] U.S. Cl. ...................................... 92/261; 222/452
[58] Field of Search ................ 222/444, 452; 414/219; 418/140, 125, 129; 415/174, 90; 251/172, 314, 316

[56] References Cited

U.S. PATENT DOCUMENTS

| | | | |
|---|---|---|---|
| 742,969 | 11/1903 | Clapp | 222/452 X |
| 782,722 | 2/1905 | Buerger | 222/452 |
| 3,477,691 | 11/1969 | Griswold et al. | 251/172 |
| 3,556,355 | 1/1971 | Ruiz | 414/219 X |
| 4,009,788 | 3/1977 | Waldhofer | 414/219 X |
| 4,244,705 | 1/1981 | Seidl et al. | 414/219 X |

FOREIGN PATENT DOCUMENTS

| | | | |
|---|---|---|---|
| 670709 | 10/1964 | Italy | 222/444 |
| 6609844 | 1/1968 | Netherlands | 222/444 |

Primary Examiner—Edward K. Look
Attorney, Agent, or Firm—Daniel E. McConnell

[57] ABSTRACT

The vaneless rotary airlock valve of this invention is designed to overcome the deficiencies of excessive leakage, excessive wear, and product degradation associated with conventional vaned rotary airlocks. It is comprised of a vaneless rotor (a cyclindrical or barrel-like container), a pair of sealing rings (one on the upstream side and one on the downstream side of the rotor), and (depending on the operating conditions) a pair of either compression or expansion rings which urge continuous sealing engagement between the sealing rings and the rotor.

Prevention of static leakage is a unique feature of the airlock of this invention, as one sealing ring is always in sealing engagement with the rotor as it revolves. The airlock may or may not permit dynamic leakage; processing gas may be bled off between the sealing rings and returned to the process, a critical feature on vacuum systems and on systems where expensive or harmful gases are used for conveying or impregnating process materials.

The airlock of this invention provides an airtight transition compartment which prevents fluid leakage from a higher pressure zone to a lower pressure zone while simultaneously conveying process material from one zone to another.

18 Claims, 16 Drawing Sheets

VANELESS ROTARY AIRLOCK VALVE

This application relates to rotary airlock valves, and more particularly to vaneless rotary airlock valves, the present application being a continuation-in-part of co-pending application Ser. Nos. 570,586, filed January 13, 1984 (now abandoned), and 882,351, filed July 7, 1986, now abandoned. This invention also relates to my previous U.S. Pat. Nos. 4,215,722, 3,888,460, 4,295,633, and 4,467,701, and more particularly to sealing elements for valves shown in those patents.

Rotary airlocks have wide application in industry wherever dry free-flowing powders, granules, crystals or pellets are used. Airlocks are used on pneumatic conveying systems, dust control equipment, and as volumetric feeders for metering materials at precise flow rates from bins, hoppers, or silos into conveying or processing systems. The basic use of the airlock is as an airtight transition point, sealing pressurized systems against loss of air or gas while maintaining a flow of materials between components with different pressure.

Most conventional rotary airlocks conform to the basic design principle of a vaned rotor which revolves within a cylindrical casing. The problems associated with the vaned design are well known, principally being leakage, wear and product degradation.

The bladed wheel configuration of vaned airlocks is not geometrically conducive to sealing between the blades of the rotor and the insides of the casing. There are, therefore, two types of leakage inherent with vaned airlocks static and dynamic. Static leakage is that which occurs between the rotor tips and the airlock casing, and accounts for 70 to 80 percent of total leakage. Static leakage (also called gap or clearance leakage) occurs whether or not the rotor is turning, and increases with wear of the airlock. Dynamic leakage is the amount of air or gas that fills the pockets of the rotor (the areas between the vanes of the rotor) as it revolves from the high pressure side to the low pressure side of the airlock. Dynamic leakage results from the pumping action of the airlock, and occurs only when the rotor of the airlock is turning. It accounts for 20 to 30 percent of total leakage, depending on pocket size and the speed at which the airlock turns. Neither static nor dynamic leakage can be disinherited from the generic vaned rotary airlock.

Major airlock damage occurs as a result of the gaps or clearances between the tips of the vanes of the rotor and the inside of the casing. The gaps permit static leakage through the airlock, which means that a continuous flow stream with varying levels of velocity is flowing between the tips of the vanes and the inside of the airlock casing. Jointly, the two surfaces that comprise the gap act as a rectangular orifice in restricting flow. The stream that is flowing through the created orifice is laden, in most operating conditions, with highly abrasive particles. The orifice created by the vane tips and the casing is, therefore, subjected to a continuous sandblasting effect. In varying lengths of time, the vanes and the casing become severely eroded from the sandblasting, rendering the airlock unusable and resulting in production loss and costly replacement of the airlock.

Product degradation takes different forms depending on the product and the process. The form of product degradation associated with conventional vaned rotary airlocks is the production of "fines." Fines are the small particles produced in vaned rotary airlocks as a result of material that becomes drawn into the gaps or clearances between the tips of the vanes of the rotor and the inside of the airlock casing. The rotating action of the vaned rotor crushes the material lodged in the gaps into smaller particles. Depending on the material being conveyed through the airlock, the production of fines may be excessive or relatively small. While fines are the desired end product of certain processes, they are undesirable and classified as reject material in other processes. In any event, vaned rotary airlocks would not be the chosen item of equipment for the desirable production of fines.

As can be seen from the foregoing, conventional vaned rotary airlocks, due to their inherent leakage, wear and product degradation problems, do not properly fulfill their intended application function.

The principle object of the airlock valve of this invention is to prevent fluid leakage from a higher pressure zone to a lower pressure zone while simultaneously conveying process material from one zone to another. The airlock of this invention, due to its vaneless rotor and sealing ring system, has no static leakage and may or may not have dynamic leakage, depending on user choice. The airlock of this invention does not permit static leakage, as one sealing ring is always in engagement with the revolving rotor. The airlock may or may not have dynamic leakage; processing gas may be bled off between the sealing rings and returned to the process, thereby preventing its loss from the system. Prevention of leakage, either static or dynamic, is a unique feature of the airlock of this invention. This unique feature becomes of critical importance on vacuum systems and on systems where expensive or harmful gases are used for conveying or for impregnating the process materials. The airlock of this invention overcomes the deficiencies of excessive leakage and excessive wear associated with conventional rotary vaned airlocks.

Rotary airlocks for handling dry abrasive materials present especially difficult sealing and wear problems. To overcome these problems, it is essential to form a perfectly tight seal on both the upstream and the downstream sides of the rotor, and yet there must be easy axial rotation of the rotor. Furthermore, if the airlocks are installed on process systems, shutting down the equipment for replacement of the rotor or the entire airlock may be extremely costly. The airlock must, therefore, be constructed to withstand long wear without replacement.

Further objects of this invention are an airlock construction which: provides maximum security against leakage, reduces wear to a minimum, does not produce fines, and ensures smooth and easy operation of the airlock. Another object is to provide an airlock construction which is adapted for components made of ordinarily-used materials, but which also can have component parts made of hard plastics, ceramics or special high alloy metals (where extreme temperature or load conditions preclude the use of ordinary materials).

The airlock of this invention does not lose its sealing effectiveness with use. The sealing system is designed to compensate for wear. As the sealing rings wear due to rubbing contact with the revolving rotor, a wear-in occurs between the surfaces of the sealing rings and the surface of the rotor, improving the airlock's sealing effectiveness with use. Therefore, static leakage does not develop with normal wear. Neglecting dynamic leakage or precluding it, as the choice may be, the airlock of this invention fulfills the intended objective of preventing fluid leakage from a higher pressure system to a lower pressure system while simultaneously conveying process material.

The airlock valve here disclosed includes a valve casing, bearing flanges for guiding the rotor, and drive means, all of which may be of generally conventional construction. Employed as the sealing and conveying elements are: a vaneless rotor, a pair of sealing rings (one on the upstream side and one on the downstream side of the rotor), and (depending on the operating conditions) a pair of either compression rings or expansion rings positioned in back of each sealing ring. These rings urge the sealing rings inwardly into continuous engagement with the rotor, to a greater or lesser extent depending on the ring material and the load conditions. The sealing rings are shaped and proportioned in such manner as to engage the rotor at an angle with respect to the direction of flow. Furthermore, the sealing rings have surfaces disposed in a specific relationship with the rotor, as will be described in detail.

The higher fluid pressure may be on the top sealing ring side or it may be on the bottom ring side. Regardless of which side of the airlock is the high pressure side, there is no static leakage through the airlock. One ring is at all times in sealing engagement with the rotor; when the rotor opening is open to the top ring the solid portion of the rotor is exposed to the bottom ring. Conversely, the solid portion of the rotor is exposed to the top ring when the rotor opening is open to the bottom ring. The solid rotor surface is always exposed to one of the two sealing rings. Therefore, static leakage is prevented from occurring from the high pressure side of the airlock to the low pressure side of the airlock since one or the other sealing ring is always in engagement with the rotor.

Although the foregoing is the basic and preferred embodiment of the present invention, there are at least two other embodiments that are configured for special operating conditions. These embodiment variations each contain components of the basic embodiment, arranged in different ways to obtain specific operating results.

The first of these embodiments comprises two casings, two rotors, two sealing rings and two compression or expansion rings. These components are arranged one each in each casing. In each casing the sealing ring is positioned on the top side of each rotor. This arrangement allows all of the conveyed material to flow free of the airlock with no entrapment. This configuration is used on those processes where the material being conveyed may change from one color to another or where the chemical composition of the material may change from one process to another, and where there can be no mixing of colors or chemical compositions from one process run to another. In this configuration, one sealing ring is always in engagement with one rotor while the other rotor is open to the process. These special sealing and draining features of the airlock will be described in detail.

The second embodiment comprises three casings, three rotors, three sealing rings and three compression or expansion rings, depending on the operating conditions. Again, one each of the components is arranged in each casing, and as in the second embodiment, the sealing rings and the compression or expansion rings are mounted on the top side of each rotor. This embodiment incorporates the clean draining feature of the second embodiment, and it also provides for recovery of processing gas. This embodiment is used on processes where an expensive or hazardous gas is used for processing and must be recovered for economic or environmental reasons. Sealing and recovery features of this airlock configuration will be described in detail in this text. It is to be understood that a configuration with two rotors and three sealing rings will also recover processing gas, but will not clean drain.

Other advantages and novel features of the airlock of this invention will be apparent from the description that follows.

BRIEF DESCRIPTION OF THE DRAWINGS

FIGS. 1, 2 & 3. The casing of the airlock valve of this invention consists of a pair of integral flange connections for adapting the airlock onto the conduit of the process system. Perpendicular to the flanges are two shouldered openings for mounting bearing flanges. The rotor is fitted into the casing through these openings and is mounted in position by the bearing flanges. The sealing rings are fitted into the casing openings of the connection flanges. The outside diameter of the sealing ring is a matching diameter with the inside diameter of the casing. The sealing ring is guided by the inside surface of the casing. The top sealing ring is constructed exactly the same as the bottom sealing ring. The top ring is assembled in the same relationship to the rotor as the bottom ring, but in the reverse position. Either a compression ring or an expansion ring is positioned in back of each sealing ring and is held in either compressive or expansive relationship with each sealing ring by the casing insert. Each flange connection has an internal shoulder with threaded holes into which the casing inserts are fastened with cap screws. The rotor has a single elliptic opening which aligns with the openings of the sealing rings and the interior openings of the casing when the airlock is operated. The airlock valve of this invention is symmetrical in design and is intended for use in either direction, that is, with either the top sealing ring or the bottom sealing ring on the downstream side.

FIG. 4. The vaneless rotor (a drum-shaped or barrel-like container) is constructed of three components: a hollow cylinder with a single elliptic opening located midway between each end, and two pivotal end caps for supporting and for driving the rotor. The end caps are inserted into each end of the hollow cylinder and secured by either bonding or welding; it is intended that the end caps be reusable with replacement cylinders. The three major diameters of the assembled cylindrical rotor are made to a common center for concentric rotation about its central axis. The elliptic opening of the rotor is made to correspond in size and shape to the inside elliptical opening of the sealing rings, which will be described later in this text.

The cylinder may be made either of metal or hard plastics. If made of metal, the surface of the cylinder is hard chrome plated or coated with a ground and polished wear-resistant material, to obtain perfectly tight sealing and a smooth surface for the sealing rings to run against. Depending on operating conditions, the cylinder may be hard chrome plated or coated with ceramic, tungsten carbide or other hard facing materials. The pivotal shafts on each of the end caps are made with keyways for driving and for instrumenting the rotor.

It is anticipated that certain operating systems will require proportional speed control; that is, the airlock will need to be instrumented to proportionally increase and decrease in turning speed to process material flow demand.

The ellipticity of the opening into the barrel-like cylindrical container of the rotor will be described in detail later as it relates to the shape of the sealing ring and to the size of the opening of the valve casing, all of which have a direct relationship to dry material flow, as will be seen. The volumetric capacity of the rotor is designed to be equal to or greater than similarly-sized conventional vaned rotary airlocks.

Figure 1:
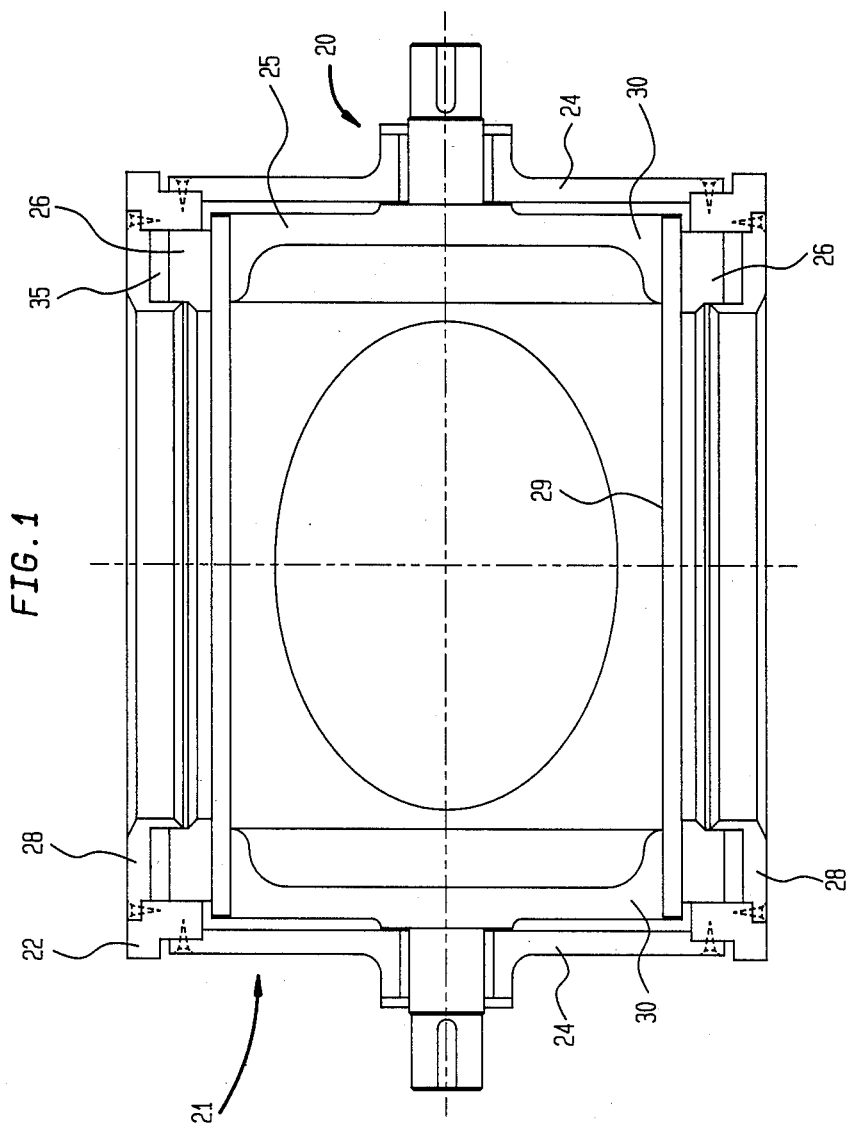
FIG. 1 is a side view of the vaneless rotary airlock.
Figure 2:
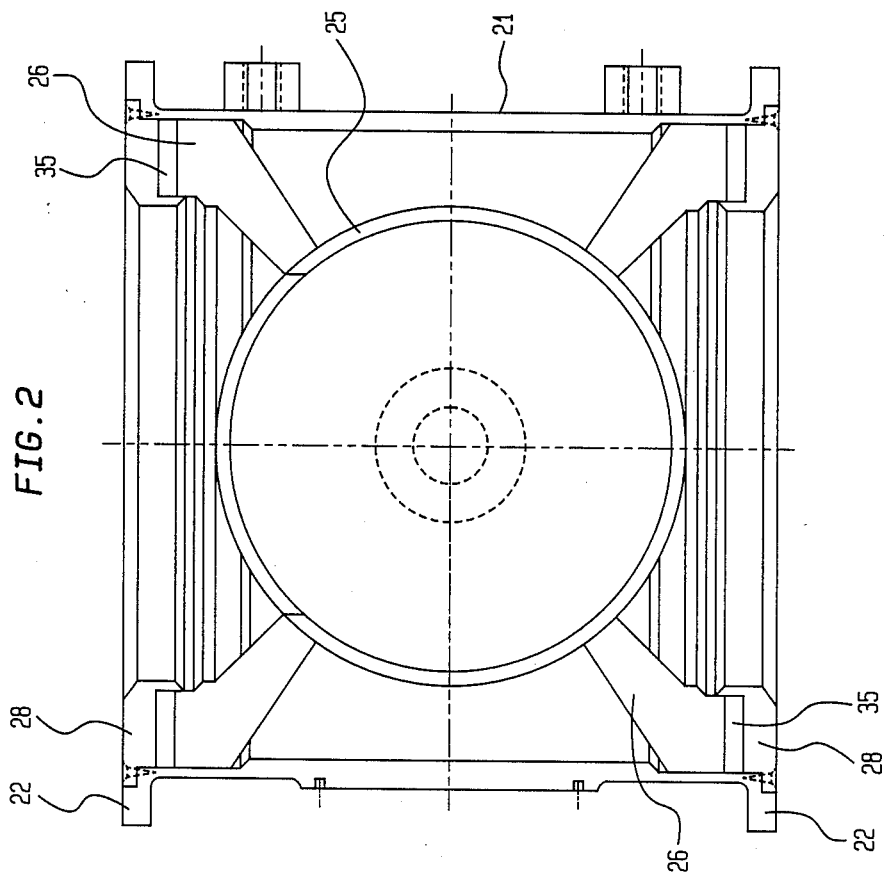
FIG. 2 is an end view of the airlock.
Figure 3:
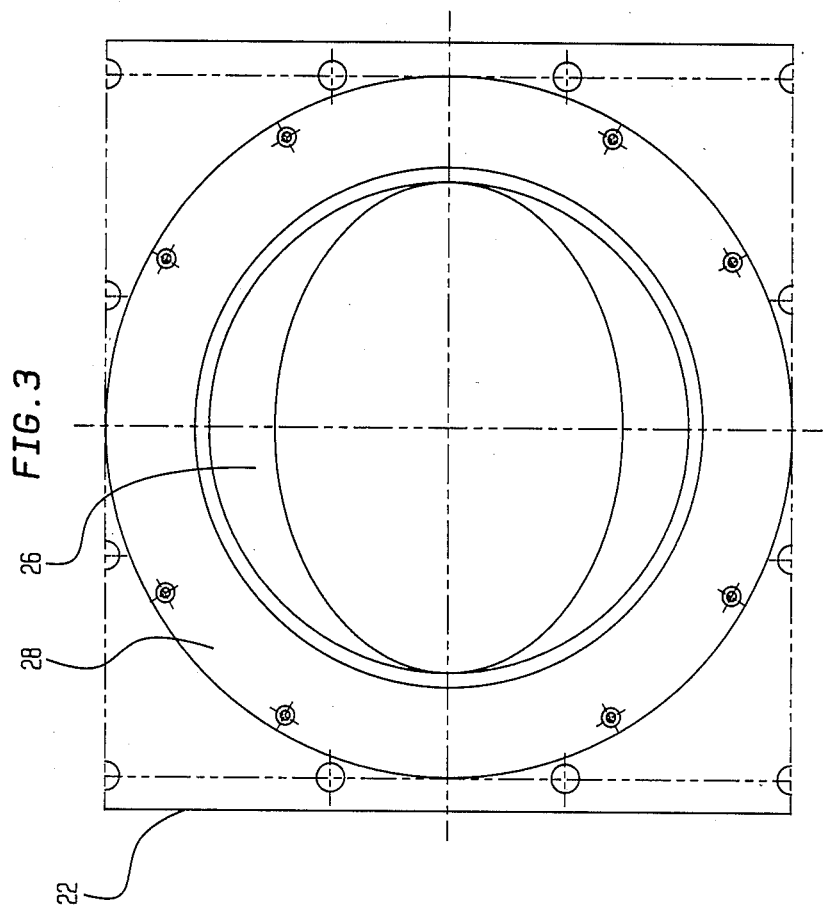
FIG. 3 is a top view of the airlock.
Figure 4:
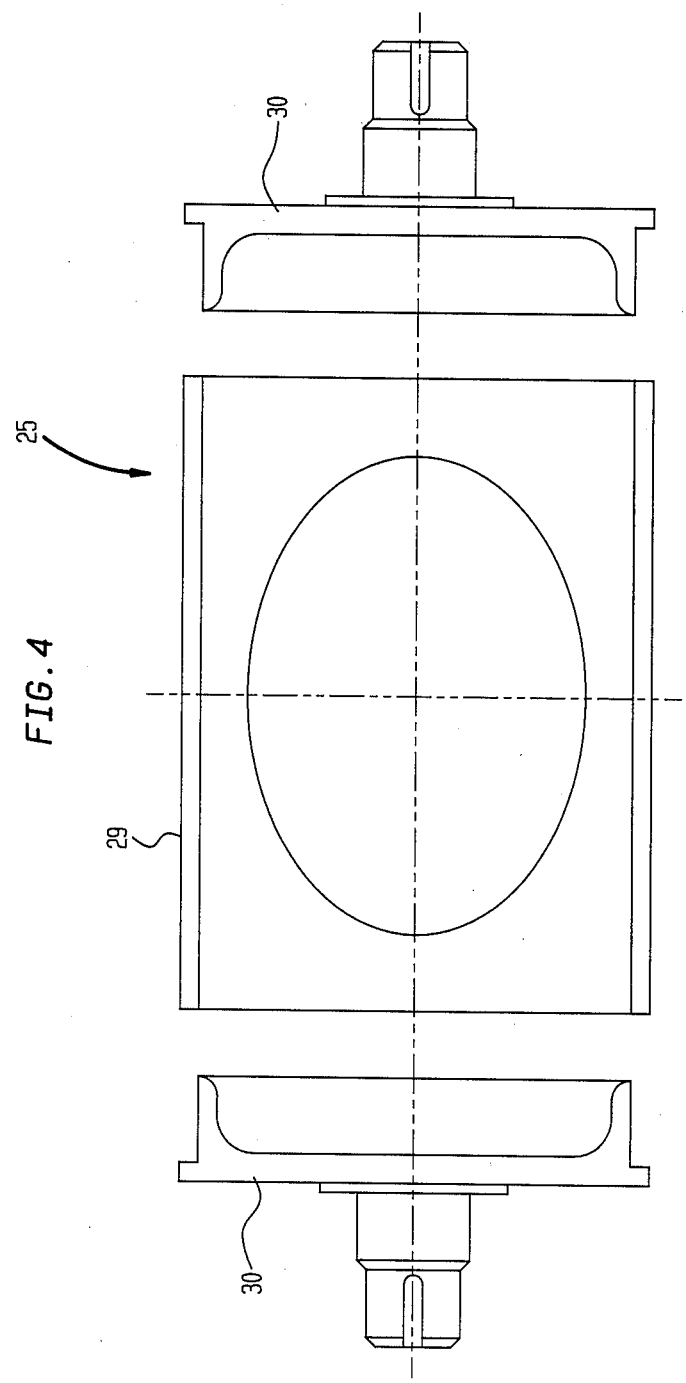
FIG. 4 is a cross-sectional side view of the rotor assembly.
Figure 5:
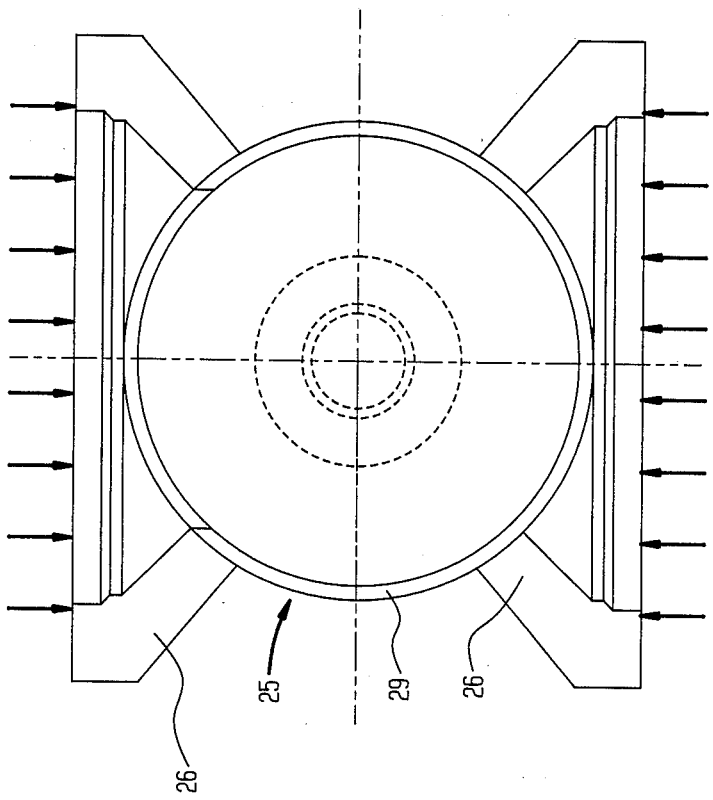
FIG. 5 is a cross-sectional end view of the rotor and sealing rings assembly.

FIG. 5. Shown mounted schematically, the rotor is positioned between two sealing rings. The view is a plane cutting the minor axis of the elliptic rotor opening. One sealing ring is mounted on the top side of the rotor, and one sealing ring is mounted on the bottom side of the rotor; the rings are the same except reversed in position. Each sealing ring is urged inwardly into engagement with the rotor as it revolves about its central axis. The means of inward urgement of the sealing rings is either compressive or expansive and will be described in a later section of this text. The foregoing depicts the basic configuration of the airlock valve of this invention. Other configurations will be depicted in subsequent sections of this text.

The elliptic opening of the rotor is shown in alignment with the top ring; the bottom ring is shown in full sealing engagement with the rotor. It can be seen from this illustration that when the opening of the rotor is aligned with the top sealing ring, dry material flows by gravity into the cavity of the rotor. It can further be understood that when the elliptic opening in the rotor revolves into alignment with the bottom ring the material will flow out of the rotor by gravity and into the process system. From this illustration, it can be seen and understood that material is conveyed from one side of the airlock to the other side of the airlock without static leakage, as one sealing ring is always in engagement with the rotor. The unique feature of the airlock valve of this invention is that it provides perfectly tight sealing, consequently preventing static leakage through the airlock while simultaneously conveying material from one pressure zone to another pressure zone of the process system.

Figure 6:
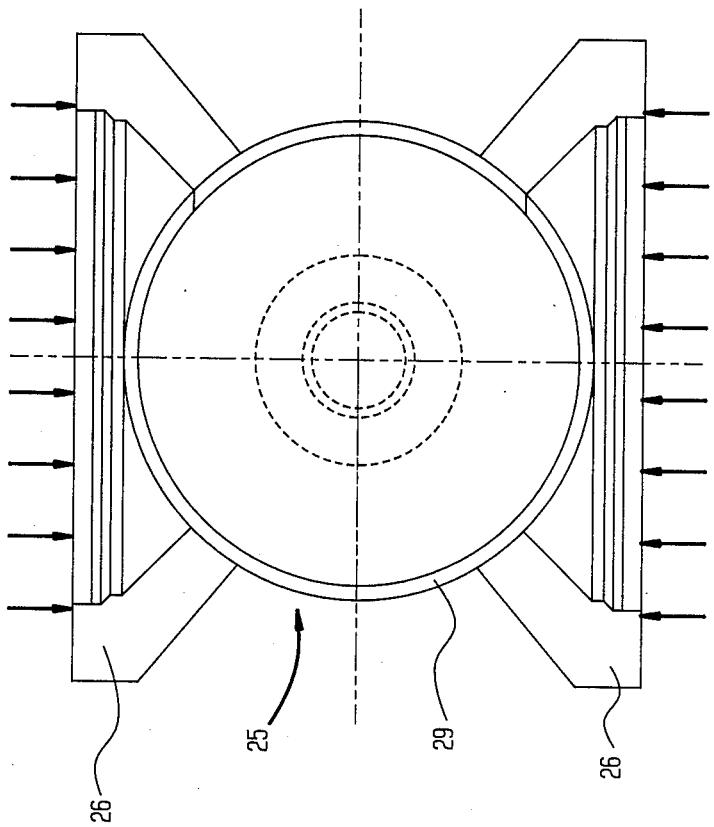
FIG. 6 is a cross-sectional end view of the rotor and sealing assembly.
Figure 7:
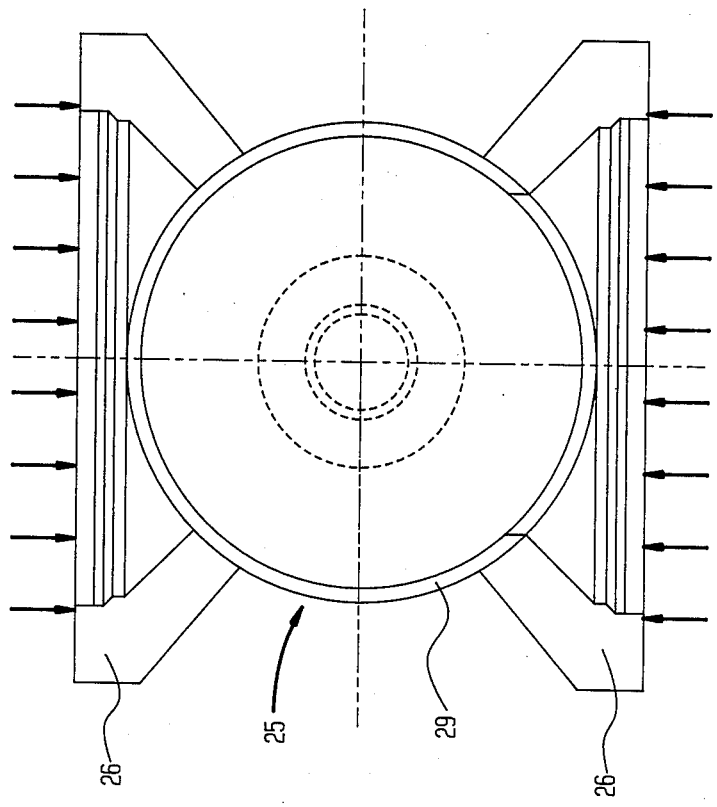
FIG. 7 is a cross-sectional end view of the rotor and sealing rings assembly.

FIG. 6. This illustration is a continuation of FIG. 5. In this illustration the elliptical opening of the rotor is shown rotated clockwise 90°. In this momentary position, a rotational span of 90°, it can be seen that the rotor opening extends from the inside of the top sealing ring to the inside of the bottom sealing ring. As the rotor continues to revolve, its opening simultaneously closes at the top ring and simultaneously opens at the bottom ring, thereby maintaining sealing engagement from ring to ring. Thus, no static leakage is permitted through the airlock FIG. 7. This illustration is a continuation of FIGS. 5 and 6. This illustration shows the opening of the rotor rotated to be in alignment with the bottom sealing ring. It can be seen that the top ring is now in full sealing engagement with the rotor. In this position it can be understood that the dry material in the cavity of the rotor flows by gravity into the lower side of the process system.

It has been shown by these illustrations that material flows into the barrel-like cylinder of the rotor when the rotor opening is aligned with the top ring, and that the rotor revolves 180° and discharges the material into the lower process system without static leakage occurring from the high pressure side to the low pressure side of the airlock.

It would be simplistic to illustrate the 270° rotational position of the opening, as it is a repeat of the 90° position.

It should be noted that the rotor does not normally turn in 90° increments as depicted in these illustrations, but revolves continuously through a 360° revolution. In so doing, it is always in sealing engagement with either the top ring or the bottom ring, thereby preventing static leakage through the airlock of this invention. As shown in these illustrations, sealing engagement from ring to ring is simultaneous, therefore preventing leakage from one side of the airlock to the other side of the airlock. The speed of rotation is generally maintained under 20 revolutions per minute. The rotor may revolve either clockwise or counter-clockwise; the sealing effectiveness of the airlock remains the same for either direction of rotation.

Figure 8:
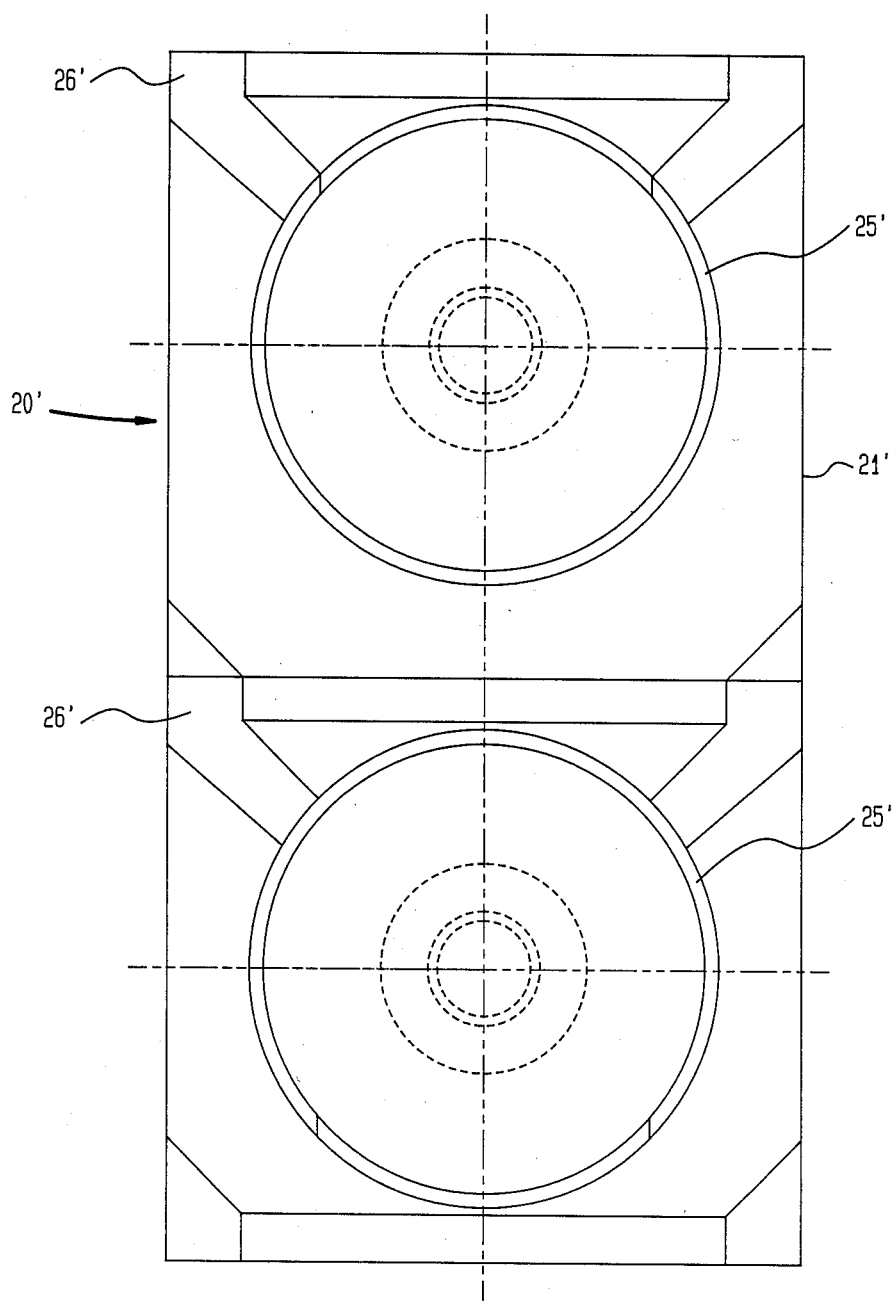
FIG. 8 is a cross-sectional end view of a two rotor airlock embodiment.

FIG. 8. Shown in this illustration is the first of the two embodiments for special process results of the airlock valve of this invention. This embodiment consists of two casings, two rotors and two sealing ring systems. It can be seen that the sealing rings are mounted on the top side of each rotor. It further can be seen that the opening of the top rotor is aligned with its respective sealing ring, and furthermore, the opening of the bottom rotor is aligned with the lower opening of the lower casing, and that the bottom rotor is in full sealing engagement with its ring. The purpose of this arrangement is to provide an airlock configuration that provides clean draining of the material being conveyed. It can be seen that the material discharged by the top rotor falls without obstruction into the cavity of the second rotor and, in turn, falls from the second rotor directly into the lower process system. In this embodiment there exist no cavities or voids to collect and hold material.

A single drive motor revolves the two rotors in unison. Therefore, the openings of the rotors always retain their respective positions throughout the 360° revolution. It can be understood that when the rotors have revolved 180° the top sealing ring is in full engagement with the top rotor and the opening of the bottom rotor is aligned with its sealing ring. The two rotor openings are face to face. One rotor is always in full sealing engagement with its respective sealing ring; therefore, the airlock of this embodiment conveys material from one pressure level to another pressure level with no static leakage.

This airlock embodiment is used on those operating conditions that do not permit any retention of the material being conveyed; it precludes material entrapment.

Figure 9:
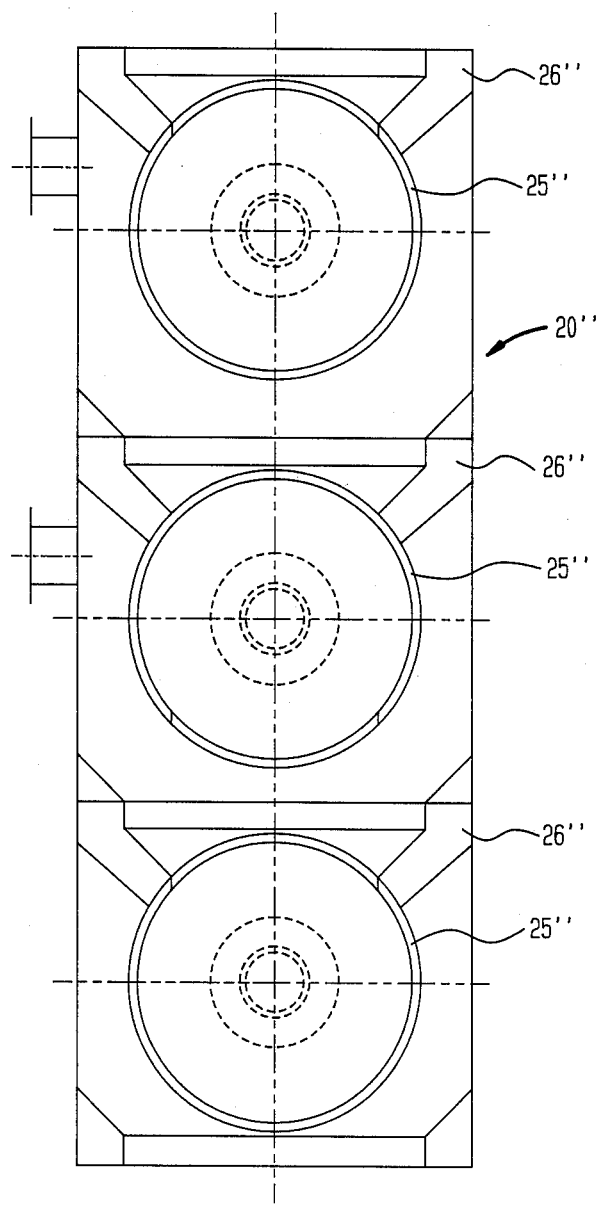
FIG. 9 is a cross-sectional end view of a three rotor airlock embodiment.

FIG. 9. This embodiment incorporates the clean draining feature of the two rotor embodiment illustrated in FIG. 8, but also provides for the recovery of processing gas. The airlock configuration of this invention consists of three casings, each casing consisting of one rotor and one sealing ring system.

With many processes, it is a requirement to recover the gas used for processing of the dry material. Dry material may be fed into and discharged from a pressurized vessel. It would not be possible to supply the vessel with a continuous flow of dry material if the processing gas under pressure could not be retained by the airlocks adapted on each end of the pressurized vessel.

With this illustration, assume the high pressure side of the airlock to be at the bottom, and the top side of the airlock to be at atmospheric pressure, while the bottom side is at a pressurized value which must be maintained simultaneous with a flow of dry material into the vessel. It can be seen that the opening of the top rotor is aligned with its sealing ring. It is open to material flow. It furthermore can be seen that the opening of the bottom rotor is aligned with its sealing ring, and that the opening of the middle rotor is aligned with the opening of the bottom rotor. The openings of the bottom and middle rotors are face to face. It can further be seen that the middle rotor is in full engagement with its sealing ring.

As in the two rotor embodiment of FIG. 8, a single drive motor revolves all three rotors in unison; therefore, the openings retain their respective relationships throughout their 360° rotations. It can be understood that when the openings revolve 180°, the bottom rotor will be in full sealing engagement with its sealing ring, and the opening of the top rotor will be face to face with the opening of the middle rotor. As the rotors revolve, the dry material is conveyed downward, and the pressurized processing gas flows into the chamber created by the middle and top rotors and their sealing ring systems, where it is drawn off and returned to the system. Processing gas recovery occurs as the top rotor is revolving from 90° through 270°. During this rotational span of 180°, the top rotor is in full sealing engagement with its sealing ring. Therefore, there is no loss of processing gas to the atmosphere.

A combination of three sealing ring systems and two rotors will provide for recovery of processing gas only, but this combination will not also provide for clean draining of the process material.

It can be seen that the three rotor airlock embodiment of this invention also conveys material from one pressure level to another pressure level with no static leakage, and in addition, it also provides for the recovery of processing gas under varying levels of pressure. If the low pressure and high pressure sides are reversed, the processing gas is recovered from the chamber created by the middle and bottom rotors and their sealing ring systems.

Figure 10:
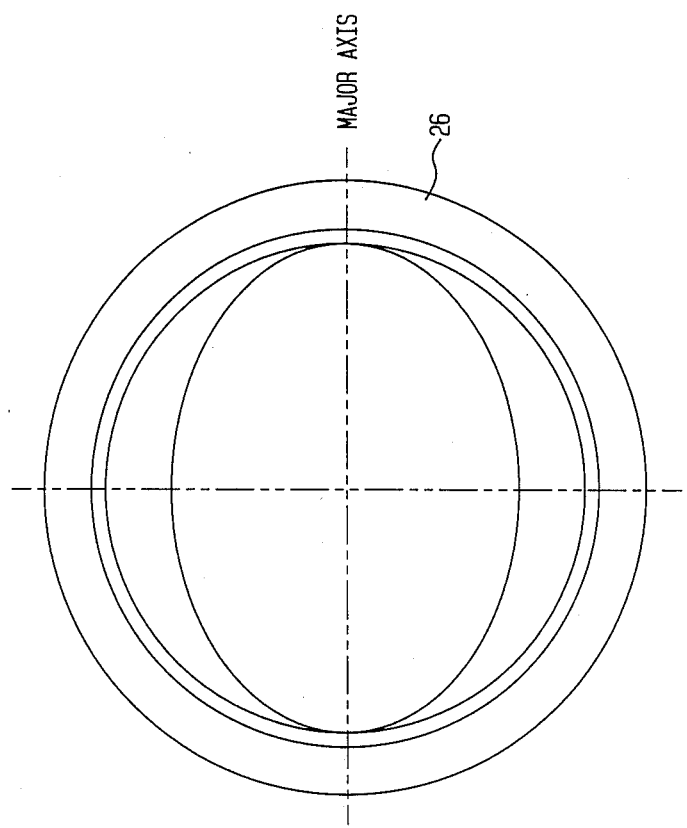
FIG. 10 is a top view of a sealing ring.

FIG. 10. The top view of the sealing ring shows both the minor axis and the major axis of the elliptic opening of the ring. (The views shown in FIGS. 5, 6 and 7 were taken along a plane cutting the minor axis.)

To determine the optimal opening for the passage of dry material through the airlock of this invention, one must refer to the basic geometry of a cross-sectional view of the cylindrical rotor. Two lines intersecting at 45° at the diametrical center are extended to the diameter of the cylinder. The points were the lines intersect the diameter represent the maximum opening, either circular or elliptic, that can be installed in the cylinder and made to seal with sealing rings. Therefore, the diameter of the cylinder determines the size of the opening.

A 45° ellipse, the minor axis of which is equal to the optimal diameter as determined in the aforementioned manner, provides the most advantageous geometrical opening for the airlock of this invention, due to the nature of dry materials when subjected to a flow path. When subjected to reduced conduit openings such as venturi shapes and orifices, dry materials will "bridge," particles lodging against each other to cause flow blockage. As compared to the handling of liquids and gases, the handling of dry materials requires large physical systems with nonbridging flow paths. The geometric shape of the ellipse lends itself to this requirement. As used in the airlock of this invention, the elliptical openings of the sealing rings and the rotor provide a nonbridging flow path, while permitting the economy and flow efficiency of circular conduits. The elliptical openings of the sealing rings and the rotor provide a larger and nonbridging flow path through the airlock than can be achieved with a circular opening installed within the same physical constraints. The elliptical openings also permit elongating the rotor to obtain greater volumetric capacity, essential for conveying dry materials.

The sloped and vertical inside walls of the sealing ring also aid the flow of dry materials. At the minor axis of the elliptical opening, the inside walls of the ring are vertical. The sloped walls provide the streamlined flow path and economy of scale while the vertical wall portions provide the critical nonbridging requirement of dry material flow handling.

If the opening through the sealing ring were a circle and not an ellipse, the diameter of the circle would be the same dimension as the minor axis of the ellipse, in which case the 45° slope or venturi would extend around the full inside circumference of the sealing ring. Such a sloped surface would have the potential of causing flow blockage of dry materials. The elliptical opening, however, provides vertical walls at the major axis of the ring, thereby precluding the bridging potential of dry flowing materials. The elliptical openings of the sealing rings and the cylindrical rotor combine both sloped and vertical wall flow paths into an efficient, smoothly operating, nonbridging and long-wearing airlock valve.

Figure 11:
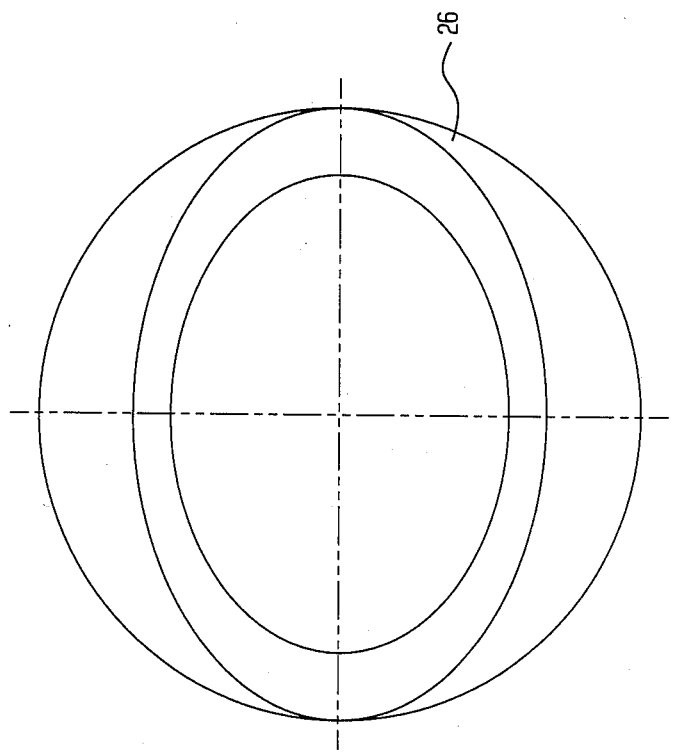
FIG. 11 is a bottom view of a sealing ring.

FIG. 11. As seen in this bottom view, the sealing surface of the sealing ring is bounded by an inside ellipse and by an outside ellipse. The differential area of the two ellipses is the rotor contact surface of the sealing ring.

The area of the ring's sealing surface may be approximated by the formula:

$$\text{Area} = 3.1416 \, ab.$$

Using the formula, the area of the outside ellipse minus the area of the inside ellipse equals the approximate area of the sealing surface of the sealing ring. The ellipses are at different elevations, a slope slightly greater than 45° at the minor axis. The elevation differential diminishes to a 0° slope at the major axis.

The ellipticity of the inside ellipse is 45° and is the basis for the 45° slope of the inside walls of the sealing ring at the minor axis. The ellipticity of the outside ellipse is determined by a straight line extending from the outside diameter of the sealing ring through a center having the same radius as the rotor. It can be seen that the outside of the sealing ring also has sloped and vertical wall portions. The walls are vertical at the major axis and sloped at the minor axis. The slope of the outside wall portions is determined by the ellipticity of the outside ellipse. The functional value of the vertical and sloped outside walls to the operating performance of the airlock is described in detail in another section of this text.

In this illustration it can be seen that the width of the ring's sealing surface varies as it traverses across and around the rotor; it is widest at the major axis and is narrowest at the minor axis. The sealing surface also varies in slope from the major axis to the minor axis.

Figure 12:
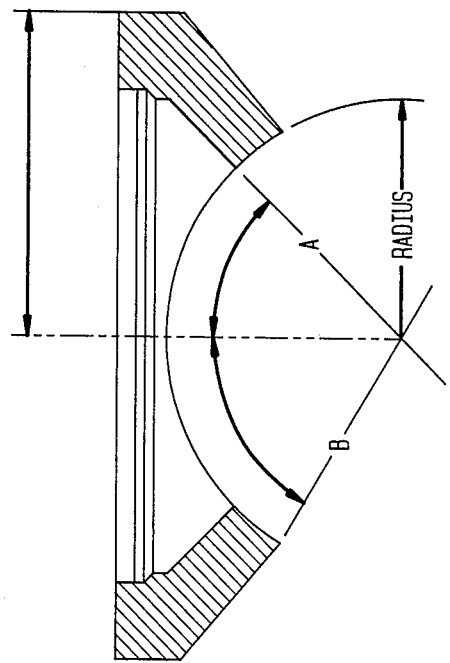
FIG. 12 is a cross-sectional layout of a sealing ring.

FIG. 12. This illustration shows the constructional layout of the sealing ring. The view is a cross-sectional plane cutting the minor axis of the ring's inside and outside ellipses.

Two angles, A and B, are shown in this illustration. Angle A determines the inside dimension of the sealing ring at the minor axis, and angle B, as it relates to the outside diameter of the ring, determines the area of the sealing surface of the sealing ring. Additionally, angles A and B determine the angles of engagement of the walls of the sealing ring to the rotor. Angle A determines the 90° rotational span opening, and, therefore, is made 45° as measured from the vertical center line. (As has been seen, an angle A greater than 45° would result in static leakage of the airlock.) The inside diameter of the sealing ring is determined by the intersection of angle A and a line drawn tangential to a circle having the same radius as the rotor. At that intersection, the inside wall of the ring becomes both concentric and vertical.

Angle B extends on a line drawn from a diametrical center having the same radius as the rotor to intersect with the tangential line at the outside diameter of the sealing ring. The outside diameter of the ring is made to be approximately 25 percent greater than the diameter of the rotor. This ratio produces the approximately desired cantilevered "wraparound ring" effect (which is described elsewhere in this text), achieving a perfectly tight seal of the sealing ring to the rotor.

Both angles A and B radiate from a diametrical center having the same radius as the rotor. This makes the engagement of the sealing ring to the rotor "normal" to the surface of the rotor throughout its entire sealing surface. Normal to the surface means that both the inside and outside walls of the sealing ring engage the rotor surface at 90° angles. This design feature is critical to both the proper operation and the proper function of the airlock valve of this invention. If the sealing ring were to engage the rotor at an obtuse angle (more than 90°), the ring and the rotor would act collectively as a conveyor, pulling material between their surfaces as the rotor turned. This condition would result in a malfunction of the airlock, principally ring damage. If the sealing ring were to engage the rotor at an acute angle (less than 90°), the leading edge would self-sharpen as it rubbed against the surface of the revolving rotor. This condition would also result in a malfunction of the airlock, again causing ring damage. As the sealing ring sharpened, it would become jagged, with pieces breaking off and rolling between the surface of the ring and the rotor. The ring would have to be replaced frequently if this condition were permitted to occur.

Therefore, it is inherent in the sealing ring design of this invention that both the inside and the outside walls engage the rotor normal to their surfaces. This insures that the sealing ring and the rotor do not collectively act as a conveyor of material between their surfaces and, further, that the ring wears flat and square as it engages the revolving surface of the rotor.

Another design consideration of the sealing ring concerns the width of the sealing surface which is varied from the minor axis to the major axis in order to equalize the surface pressure between the ring and the rotor. Ring loading is direct at the major axis, but indirect (or splayed) at the minor axis. With splayed loading, the loading pressure causes the ring to tend to follow the slope of the rotor, and to expand along its minor axis. There is a difference in intensity of surface pressure between direct loading and splayed loading. Through the use of finite element stress (computer-aided) analysis, it has been found that ring surface pressure to the rotor can vary as much as 16:1 from the major axis to the minor axis depending on the diameter of the rotor. Uneven ring pressure is due to the slope of the rotor, the greatest slope being at the minor axis. Therefore, in this invention the lesser pressure intensity of the splayed loading is compensated for by varying the width of the ring's sealing surface, in order to equalize the surface pressure between the sealing ring and the rotor.

Through further use of finite element analysis, the dimension of the outside diameter of the sealing ring is finely adjusted to achieve equal intensity of pressure between the sealing surface of the sealing ring and the surface of the rotor throughout the entire area of surface contact between the ring and the rotor. It was seen earlier that a change in the dimension of the outside diameter of the sealing ring results in both width changes and area changes of the sealing surface of the ring. A change in the dimension of the outside diameter of the sealing ring changes the dimensions of both the major axis and the minor axis of the ring's outside ellipse. If ring pressure were not distributed equally over the entire sealing surface, an excessive force would have to be applied to the sealing ring to achieve a perfectly tight seal between the sealing ring and the rotor. Such excessive loading would interfere with easy operation of the airlock and, further, would cause abnormal ring and rotor wear.

As is seen, ring loading is made direct (normal to the surface) throughout the entire sealing area of the sealing ring to the surface of the rotor. Therefore, the unique sealing effectiveness of the sealing ring of this invention is accomplished by varying the dimension of the outside diameter of the sealing ring in relation to angles A and B, thus varying both the area and the cantilever of the sealing surface of the sealing ring to the surface of the rotor. Cantilevering is important to the sealing ring construction of this invention in that it provides a wrapping of the ring across and around the rotor surface, resulting in a perfectly tight seal between the rotor and the sealing ring. (The "wraparound ring" effect of this invention is analogous to the "stretched hoop" effect as taught in my U.S. Pat. No. 4,215,722.) The wraparound ring effect of this invention is the result of the sealing ring being wrapped across and around the surface of the rotor by the cantilevered loading of the ring's sealing surfaces at the minor axis. The result of the wraparound ring is perfectly tight sealing engagement with minimal applied loading forces.

Figure 13:
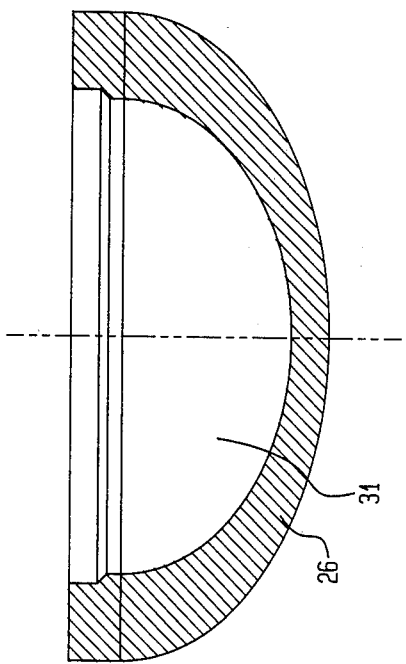
FIG. 13 is a cross-sectional side view of a sealing ring.

FIG. 13. Shown is a cross-sectional side view of the sealing ring. The view is a plane cutting the major axis of the elliptical opening of the ring.

The tangential line is drawn having the same radius as the rotor. The varying width of the sealing surface can be clearly seen as it traverses from the tangential line to the minor axis of the ellipse.

Also shown in the illustration is an area bounded by the tangential line and the inside ellipse, labeled solid section. This is the section of the ring bounded by angles A and B (FIG. 12), and extends from a circle having the same radius as the rotor at the minor axis to the tangential line. This solid section of the ring provides structural support of the ring over the elliptical opening of the rotor. As the rotor revolves through its rotation, the opening of the rotor passes underneath the minor axis of the sealing ring. To prevent the ring from dipping down as the opening passes underneath, the ring is made rigid across the two areas perpendicular to the minor axis. If the sealing ring were not made rigid in those two areas, bumping and torque cycling would occur, with resultant ring damage. The solid sections make the sealing ring self-supporting in the two areas that become unsupported as the rotor opening passes underneath.

The airlock valve of this invention is intended for continuous rotating operation, which means that the rotor revolves a full 360° at specified revolutions per minute. The airlock must operate smoothly without excessive bumping or torque cycling, either of which would be conducive to unsatisfactory operation. The rotor of the airlock valve of this invention is made to revolve within specified roundness and concentricity tolerances. The sealing rings are made to be self-supporting and to run flat against the surface of the rotor without bumping or torque cycling.

Figure 14:
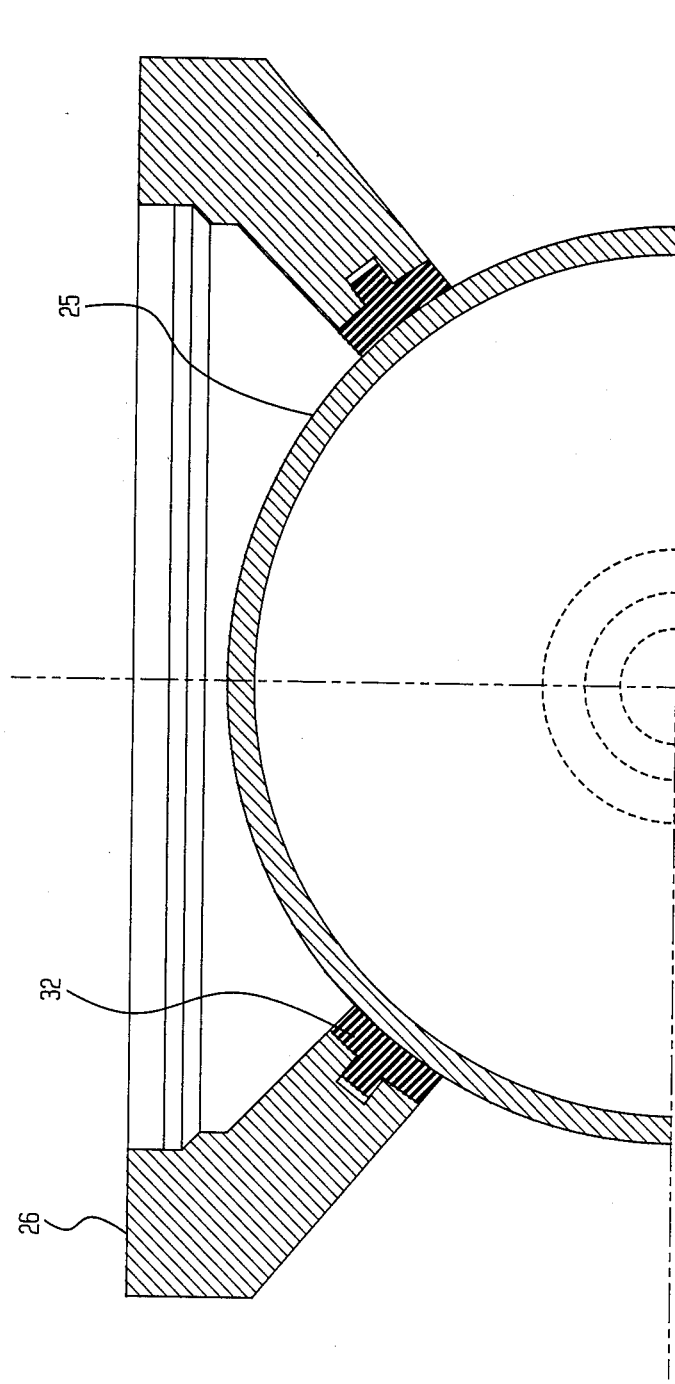
FIG. 14 is a cross-sectional view of a compression ring.

FIG. 14. The sealing ring may be constructed as a single component, or it may be made of two or more component parts. This illustration shows a two-part construction, the part interfacing with the rotor being a replaceable sacrificial wear pad.

Ring material is chosen, whenever possible, to have a low co-efficient of friction to minimize the operating torque and heat build-up of the airlock as it operates. For economy and structural rigidity, the sealing ring may be constructed of both metallic and non-metallic materials. Shown is a sealing ring constructed of a combination of materials. For instance, the upper portion of the sealing ring may be made of aluminum and the wear pad may be made of polyethylene. Some advantages of making the sealing ring of different materials are: the ring may be made more rigid; depending on the materials used, it may be more economical to make; the desired material may not be available in the size and shape needed; the desired wear material may be excessively costly; and it may be desirable to use a replaceable wear pad for performance or product compatibility.

The only significant wear that occurs to the sealing ring is to the surface that engages with the revolving surface of the rotor. A replaceable, sacrificial wear pad as shown may be attached to the structural portion of the sealing ring by bonding with an adhesive, fastening with lugs, or a combination of both, or other methods. When worn to its limit, the old pad may be replaced with a new one. The replaceable pad saves the costs of remaking the structural portion of the sealing ring. Those costs include both materials and manufacturing. Replaceable wear pads can be die cut or molded to the exact shape and size from such materials as ultra-high molecular weight polyethylene, polyurethane, or one of the newly developed engineering elastomers. There are other acceptable materials that may be used either for making the wear pads or for constructing the entire sealing ring, depending upon the end use requirement of the airlock.

Metallic sealing rings and wear surfaces may also be constructed and used where temperature or other operating conditions dictate the use of a metallic material. Special wear surfaces such as tungsten carbide and ceramics may also be used for special operating conditions.

Figure 15:
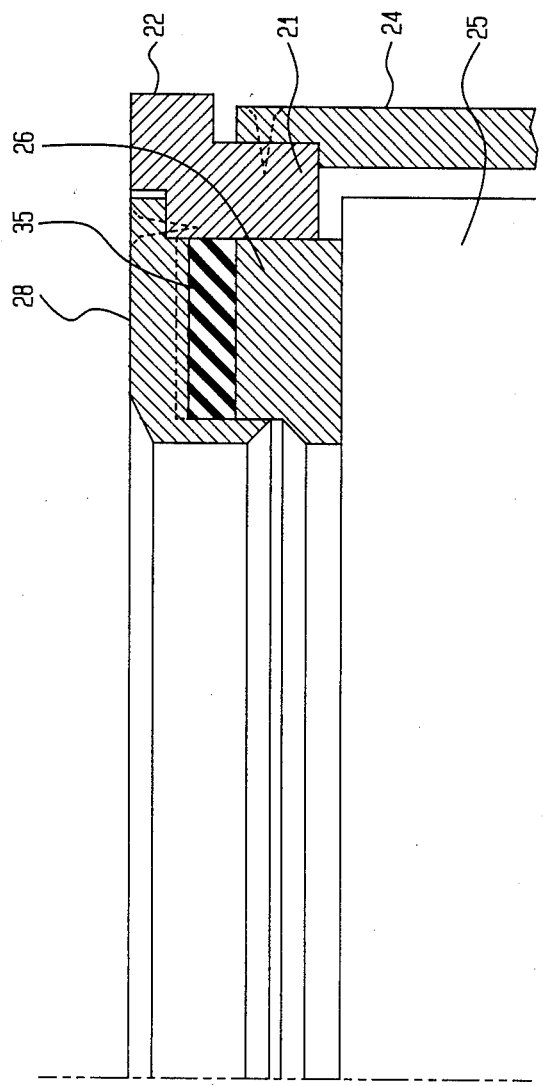
FIG. 15 is a half cross-sectional view of a compression ring.

FIG. 15. The use of plastic compression rings for urging sealing rings into continuous sealing engagement with a valve closure member is taught in my U.S. Pat. No. 3,888,460. In the airlock valve of this invention, resilient compression rings are positioned between the sealing rings and the adjacent casing inserts so that as inward pressure is applied against the resilient rings, the sealing rings are urged inwardly against opposite sides of the rotor, maintaining the sealing rings in sealing engagement with the rotor as it revolves about its central axis. The amount of compression to be applied to each of the sealing rings on opposite sides of the rotor may be calibrated and maintained at the desired level.

The compression rings are positioned between the respective sealing rings and the adjacent casing inserts and are compressively confined within the confining volume, which is defined by the opposing surfaces of the casing inserts, the sealing rings and the inside of the casing. As seen by the dotted line on the illustration, in its free state, the resilient compression ring is greater in cross-section than the confining volume of the cavity before inward pressure is applied by tightening of the cap screws. The compressive reduction of the rings by the confining volume of the cavity causes the resilient rings to urge the sealing rings inwardly against opposite sides of the rotor and to maintain the sealing rings in sealing engagement with the rotor.

It is to be understood that the resilient compression rings provide body seals for the airlock valve of this invention, in that the rings prevent flow of liquid or gas passing through the conduit in which the airlock is inserted into those portions of the valve body which surround the rotor and the sealing rings. This sealing function derives, at least in part, from the compression rings contacting the surfaces of the confining volume between the sealing rings and the casing inserts. Thus, the rings perform dual functions: compression and sealing.

The resilient compression rings may be formed of any suitable material which is capable of being deformed or compressed to a limited extent. The resilient compression rings must be resistant to fluids likely to be carried by the airlock, must have stable characteristics over a wide temperature range, and must be compressable or deformable to a limited extent. It has been found that silicone sponge rubber provides a suitable material for formation of the compression rings.

Figure 16:
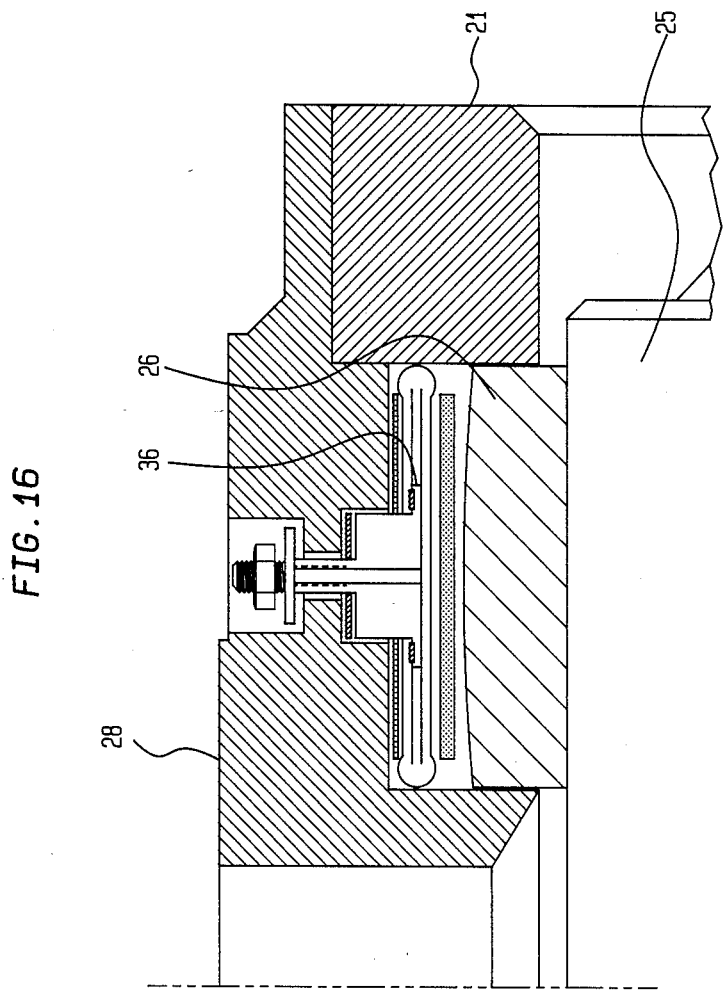
FIG. 16 is a half cross-sectional view of a metallic expansion ring.

FIG. 16. An alternate method of applying a continuous inward pressure against the sealing rings is by means of the metallic expansion ring shown in this illustration. The sealing rings are expansively urged inwardly against opposite sides of the rotor, maintaining the sealing rings in sealing engagement with the rotor. The metallic expansion ring shown is the subject matter of my continuation-in-part U.S. patent application No. 882,351, now abandoned.

As its name implies, the metallic expansion ring is constructed of all metallic components; therefore, it may be used in operating conditions (particularly high temperatures) that preclude the use of compression rings made of non-metallic materials.

The expansion ring, rather than being compressive, is expansive. That is, its initial cross-section is less than the confining volume of the ring cavity. By an internal fluid pressure source, its cross-section expands outwardly against the surfaces of the confining volume of the ring cavity.

The metallic expansion rings may be constructed of any suitable metal which is capable of being expanded and contracted to a limited extent. The metallic expansion rings must be resistant to fluids likely to be carried by the airlock, and must be able to expand and to contract to a limited extent over a wide temperature range. It has been found that one of the austenitic stainless steels and one of the high temperature nickel base alloys provide suitable materials for construction of the metallic expansion rings.

The casing insert is the portion of the valve casing which directionally resists the expansive pressure of the expansion ring. The insert is secured against a shoulder within the casing by threaded cap screws engaged with the casing. So secured, the insert becomes a rigid non-movable part of the valve casing. The expansion rings are positioned on opposite sides of the rotor between the non-movable inserts and the sealing rings. When the rings are expanded internally by means of fluid pressure, the sealing rings are expansively urged inwardly against opposite sides of the rotor, to maintain the sealing rings in sealing engagement with the rotor.

It is understood that the expansion rings also provide body seals for the airlock valve of this invention, in that the rings prevent flow of liquids or gases passing through the conduit in which the airlock is inserted into those portions of the valve body which surround the rotor and the sealing rings. This sealing function derives, at least in part, from the expansion rings contacting the surfaces of the confining volume defined between the sealing rings and the casing inserts. Thus, the expansion rings perform dual functions' expansion and sealing. To facilitate this sealing function, the expansion rings may be coated with non-metallic materials. Graphite, among other materials, has been found to be a suitable covering, as it is chemically inert and is capable of withstanding high temperatures.

The expansion rings may be expanded by any suitable fluid pressure source. The fluid may be either a liquid or a gas and pressurization may be either static or dynamic. With the static mode of pressurization, the rings may be expanded to a specified pressure level through a non-return valve, similar in function to the type of valve used for inflating tires; the pressure is removed, and the valve stem is capped. The entrapped fluid pressure within the expansion ring remains static. With the dynamic mode of pressurization, the expansion rings are expanded to a specified level of pressure by an external source of fluid pressure that remains connected to the stem of the expansion rings. The pressure is automatically regulated to maintain a selected pressure value. Dynamic pressurization is used on those operating conditions which involve wide temperature ranges and wide pressure swings. With either mode of pressurization, static or dynamic, the amount of expansive pressure to be applied to each of the sealing rings on opposite sides of the rotor may be calibrated and maintained at the desired level, regardless of any temperature or conduit pressure which is being controlled by the airlock valve of this invention.

It should be noted that with either means of inward sealing ring pressure, compression or expansion rings, both provide thermal compensation and wear compensation by increasing or decreasing their inward pressures as required by the operating conditions. Without thermal compensation, the sealing rings would either be too loose or jammed too tightly against the rotor. With either result, the airlock would not perform as intended. Without wear compensation, the sealing rings would not maintain a perfectly tight seal with the rotor; leakage would occur, and here again, the airlock would not perform as intended.

In the drawings and specification there have been set forth a preferred embodiment of the invention, and although specific terms are employed, they are used in a generic and descriptive sense only, and not for purposes of limitation.

I claim:

1. A rotary airlock valve for providing a fluid tight transition of process stream material from a first to a second zone, comprising:
   a. a casing communicating with first and second zones;
   b. a vaneless cylindrical rotor having a compartment therein for receiving and containing process stream material from said first zone;
   c. a first pair of sealing mean providing sealing engagement of the rotor and the casing in surrounding relation to the first zone from the second zone;
   d. a second pair of sealing means for providing sealing engagement of the rotor and the casing in surrounding relation to the second zone from the first zone; and
   e. means for rotating the rotor between a first position wherein process stream material may be received into the compartment from the first zone when said first zone is sealed from said second zone and a second position wherein process stream material may be discharged from the compartment into the second zone when said second zone is sealed from said first zone.

2. A valve according to claim 1 wherein said rotor is mounted within said casing for rotation relative thereto about the central longitudinal axis thereof and defines an opening for said compartment which describes an ellipse when projected onto a plane which extends through said axis and perpendicular to a diameter of said rotor which extends through the major axis of said ellipse.

3. A valve according to claim 1 wherein said first sealing means engage said rotor along a line which describes an ellipse when projected onto a plane which extends through said axis and perpendicular to a diameter of said rotor which extends through the major axis of said ellipse.

4. A valve according to claim 1 wherein said second sealing means engages said rotor along a line which describes an ellipse when projected onto a plane which extends through said axis and perpendicular to a diameter of said rotor which extends through the major axis of said ellipse.

5. A valve according to claim 1 wherein said casing and said rotor together define a third zone surrounding said rotor and interposed between the first and second zones and further wherein said first sealing means comprises wear pad means for engaging the surface of said rotor and resilient compression means for imposing sealing force on said wear pad means and for sealing the third zone from communication with the first and second zones while said compartment is communicating with one of the first and second zones.

6. A valve according to claim 1 wherein said casing and said rotor together define a third zone surrounding said rotor and interposed between the first and second zones and further wherein said second sealing means comprises wear pad means for engaging the surface of said rotor and resilient compression means for imposing sealing force on said wear pad means and for sealing the third zone from communication with the first and second zones while said compartment is communicating with one of the first and second zones.

7. A rotary airlock valve or providing a fluid tight transition of process stream material from a first to a second zone, comprising:
   a. casting means communicating with first and second zones for passage of process stream material therethrough from the first zone to the second zone;
   b. at least one elongate, vaneless right circular cylindrical rotor means for receiving and containing process stream material from the first zone and for delivering such process stream material toward the second zone, said rotor means being mounted within said casing for rotation relative thereto about the central longitudinal axis of said rotor means and having a compartment therein and defining an opening for said compartment which describes an ellipse when projected onto a plane which extends through said axis and perpendicular to a diameter of said rotor means which extends through the major axis of said ellipse;
   c. a first pair of sealing means providing sealing engagement of said rotor means and said casing in surrounding relation to the first zone from the second zone;
   d. a second pair of sealing means providing sealing engagement of said rotor means and said casing in surrounding relation to the second zone from the first zone; and
   e. means for rotating the rotor between a first position wherein process stream material may be received into the compartment from the first zone while the first zone is sealed from the second zone and a second position wherein process stream material may be discharged from the compartment toward the second zone while the second zone is sealed from the first zone.

8. A valve according to claim 7 wherein said major axis of said ellipse is parallel to said longitudinal axis of said rotor means.

9. A valve according to claim 7 wherein said first sealing means engages said rotor means along a line which describes a sealing ellipse when projected onto a plane which extends through said axis and perpendicular to a diameter of said rotor means which extends through the major axis of said sealing ellipse.

10. A valve according to claim 7 wherein said second sealing means engages said rotor means along a line which describes a sealing ellipse when projected onto a plane which extends through said axis and perpendicular to a diameter of said rotor means which extends through the major axis of said sealing ellipse.

11. A valve according to claim 7 wherein said casing and said rotor means together define a third zone surrounding said rotor means and interposed between the first and second zones and further wherein said first sealing means comprises wear pad means for engaging the surface of said rotor means and resilient compression means for imposing sealing force on said wear pad means and for sealing said third zone from communication with the first and second zones while said compartment is communicating with one of the first and second zones.

12. A valve according to claim 7 wherein said casing and said rotor means together define a third zone surrounding said rotor means and interposed between the first and second zones and further wherein said second sealing means comprises wear pad means for engaging the surface of said rotor means and resilient compression means for imposing sealing force on said wear pad means and for sealing the third zone from communication with the first and second zones while said compartment is communicating with one of the first and second zones.

13. A valve according to claim 7 further comprising a plurality of rotor means arranged within said casing for series flow of process stream material successively through said plurality of rotor means from the first zone to the second zone.

14. A rotary airlock valve for providing a fluid tight transition of process stream material from a first to a second zone, comprising:
   a. casing means communicating with first and second zones for passage of process stream material therethrough from the first zone to the second zone;
   b. an elongate, vaneless right circular cylindrical rotor means for receiving and containing process stream material from the first zone and mounted within said casing for rotation relative thereto about the central longitudinal axis of said rotor, said rotor means having a compartment therein;
   c. a first pair of sealing means providing sealing engagement of said rotor means and said casing in surrounding relation to the first zone from the second zone, said first sealing means engaging said rotor means along a line which describes a first sealing ellipse when projected onto a plane which extends through said axis and perpendicular to a diameter of said rotor means which extends through the major axis of said first sealing ellipse;
   d. a second pair of sealing means providing sealing engagement of said rotor means and said casing in surrounding relation to the second zone from the first zone, said second sealing means engaging said rotor means along a line which describes a second sealing ellipse when projected onto a plane which extends through said axis and perpendicular to a diameter of said rotor means which extends through the major axis of said second sealing ellipse; and
   e. means for rotating said rotor means between a first position wherein process stream material may be received into the compartment from the first zone while the first zone is sealed from the second zone and a second position from the compartment toward the second zone while the second zone is sealed from the first zone.

15. A valve according to claim 14 wherein said rotor means is mounted within said casing for rotation relative thereto about the central longitudinal axis thereof and defines an opening for said compartment which describes a material receiving ellipse when projected onto a plane which extends through said axis and perpendicular to a diameter of said rotor means which extends through the major axis of said material receiving ellipse.

16. A valve according to claim 14 wherein said casing and said rotor means together define a third zone surrounding said rotor means and interposed between the first and second zones and further wherein said first sealing means comprises wear pad means for engaging the surface of said rotor means and resilient compression means for imposing sealing force on said wear pad means and for sealing the third zone from communication with the first and second zones while said compartment is communicating with one of the first and second zones.

17. A valve according to claim 14 wherein said casing and said rotor means together define a third zone surrounding said rotor means and interposed between the first and second zones and further wherein said second sealing means comprises wear pad means for engaging the surface of said rotor means and resilient compression means for imposing sealing force on said wear pad means and for sealing the third zone from communication with the first and second zones while said compartment is communicating with one of the first and second zones.

18. A valve according to claim 14 wherein said major axes of said sealing ellipses are parallel one to the other and to said longitudinal axis of said rotor means.

* * * * *